(12) United States Patent
Chen

(10) Patent No.: US 6,816,210 B2
(45) Date of Patent: Nov. 9, 2004

(54) METHOD FOR FORMING A SELF-ALIGNED PIXEL ELECTRODE OF AN LCD

(75) Inventor: Hsin-Ming Chen, Hsin-Chu (TW)

(73) Assignee: Toppoly Optoelectronics Corp., Miao-Li Hsien (TW)

( * ) Notice: Subject to any disclaimer, the term of this patent is extended or adjusted under 35 U.S.C. 154(b) by 17 days.

(21) Appl. No.: 10/249,651

(22) Filed: Apr. 29, 2003

(65) Prior Publication Data

US 2004/0017530 A1 Jan. 29, 2004

(30) Foreign Application Priority Data

Jul. 25, 2002 (TW) .......................................... 91116647 A

(51) Int. Cl.⁷ ........................ G02F 1/136; G02F 1/1333; G02F 1/1339; H01L 21/00
(52) U.S. Cl. ........................ 349/44; 349/42; 349/110; 349/155; 438/149
(58) Field of Search ........................... 349/42–44, 110, 349/155, 187; 438/149

(56) References Cited

U.S. PATENT DOCUMENTS

| | | | |
|---|---|---|---|
| 6,511,869 B2 * | 1/2003 | Colgan et al. ............... | 438/149 |
| 6,535,264 B1 * | 3/2003 | Imabayashi et al. ........ | 349/155 |
| 6,573,969 B1 * | 6/2003 | Watanabe et al. ........... | 349/155 |
| 6,642,988 B2 * | 11/2003 | Matsuyama et al. ........ | 349/156 |

FOREIGN PATENT DOCUMENTS

| | | |
|---|---|---|
| JP | 2001-117085 | 4/2001 |
| JP | 2002-55350 | 2/2002 |

* cited by examiner

Primary Examiner—Tarifur R. Chowdhury
(74) Attorney, Agent, or Firm—Winston Hsu

(57) ABSTRACT

A method for forming a self-aligned pixel electrode of a LCD is introduced. The LCD includes a substrate having a plurality of adjacent pixel electrode regions. A joint side is positioned between each pixel electrode region and its adjacent pixel electrode regions. First, a spacer is formed on the joint sides of the pixel electrode regions, and the spacer has an undercut profile. Then, a transparent conductive layer is formed on the substrate, and the transparent conductive layer that covers the pixel electrode regions is separated from the spacer to form a self-aligned pixel electrode.

20 Claims, 8 Drawing Sheets

METHOD FOR FORMING A SELF-ALIGNED PIXEL ELECTRODE OF AN LCD

BACKGROUND OF INVENTION

1. Field of the Invention

The present invention relates to a method for forming pixel electrodes of a liquid crystal display (LCD), and more particularly, to a self-aligned method for forming the pixel electrodes of a thin-film transistor LCD (TFT-LCD).

2. Description of the Prior Art

Since the LCD has the advantages of portability, low power consumption, and low radiation, the LCD has been widely used in various portable information products, such as notebooks, personal digital assistants (PDA), and etc.

A color filter formed on an array (COA) is a new technology and has been commonly used to form a COA type TFT-LCD. In order to maintain the thickness of a liquid crystal layerin the TFT-LCD, namelya cell gap, plastic beads, glass beads, or glass fibers are normally interposed between two substrates of the TFT-LCD and used as spacers to precisely control the cell gap to a specific value to ensure the performance of the display. In the conventional TFT-LCD process, the spacers are positioned by spraying, and tend to be mal-distributed. Consequently, the contrast of the TFT-LCD is affected due to light scattering by the spacers that are present in the light transmitting regions, generating white point defects and reducing yield rates and the display performance. For this reason, photo spacers formed by a photolithographic process have been developed to replace the conventional plastic beads to control the dimensions and positions of the spacers and the uniformity of the cell gap to accurately raise the display performance. Moreover, the photo spacers positioned in the light opaque regions can be used to prevent the light leakage problem caused by the plastic beads.

Please refer to FIG. 1 to FIG. 3, which are schematic diagrams of a method for forming a COA type TFT-LCD 10. As shown in FIG. 1, a plurality of scan lines and a plurality of signal lines perpendicular to the scan lines (not shown in FIG. 1) are formed on a surface of a bottom glass substrate 12 of the TFT-LCD 10. The signal lines and the scan lines define a plurality of adjacent pixel electrode regions 14 on the bottom glass substrate 12. Each pixel electrode region 14 includes a TFT structure 16 comprised of a polysilicon layer, a top gate conductive layer, a gate dielectric layer, a channel layer, a source electrode, and a drain electrode (not shown in FIG. 1).

Then, a planarizing layer 18 is formed on the TFT structures 16, and a black photoresist layer (not shown in FIG. 1) is formed on the planarizing layer 18. Next, a photo-etching process (PEP) is performed to form a plurality of black matrix (BM) layers 20 in the black photoresist layer corresponding to the underlying TFT structures 16 respectively, so as to improve the contrast of the TFT-LCD 10, prevent the TFT structures 16 from generating the light leakage current, and shade the oblique leaking light during operation of the TFT-LCD 10. Thereafter, a red color filter layer (not shown in FIG. 1) is formed on the bottom glass substrate 12, and another PEP is performed to form a red color filter array (CFA) 22 in the red color filter layer. The red color filter layer is composed of a photoresist containing a red dye in an amount of 10 to 50 wt % (dry weight) or a photosensitive resin. Afterwards, a green CFA 24 and a blue CFA 26 are formed on the bottom glass substrate 12 by repeating the above-mentioned processes with dyes of different colors. Thus, an R/G/B CFA comprises the red CFA 22, the green CFA 24, and the blue CFA 26.

An overcoat layer 28 and a photoresist layer (not shown in FIG. 1) are formed on the R/G/B CFA, respectively, and a PEP is performed to form a plurality of contact holes (not shown in FIG. 1) in the overcoat layer 28, the R/G/B CFA 22, 24, 26, the BM layer 20, and the planarizing layer 18. Next, a transparent conductive layer 30 with low impedance, such as indium tin oxide (ITO), is deposited on the bottom glass substrate 12 and fills the contact holes to form a plurality of contact plugs 32 for connecting the transparent conductive layer 30 and the drain electrodes of the TFT strictures 16. Afterwards, another PEP is performed to remove portions of the transparent conductive layer 30, and an orientation film 34 is formed on the transparent conductive layer 30.

As shown in FIG. 2, another transparent conductive layer 38 is formed on a top glass substrate 36 of the TFT-LCD 10, and a plurality of protrusions 40 with a thickness of approximately 3 micrometers ($\mu$m) are formed on the transparent conductive layer 38. Then, a plurality of spacers 42 with a thickness of approximately 5 $\mu$m are formed on the protrusions 40. The spacers 42 are composed of photosensitive polyimide (PI) materials. Further, a spin-coating process is performed to form an orientation film 44 on the top glass substrate 36.

As shown in FIG. 3, the top glass substrate 36 and the bottom glass substrate 12 are positioned face to face, so that each protrusion 40 corresponds to a side of the pixel electrode regions 14, and each spacer 42 corresponds to an intersection of each signal line and each scan line. Then, a liquid crystal layer 46 is formed between the top glass substrate 36 and the bottom glass substrate 12 to complete the fabrication of the conventional TFT-LCD 10.

However, the conventional method for forming the TFT-LCD 10 has to utilize the PEP many times to form the BM layer 20, the R/G/B CFA 22, 24, 26, the transparent conductive layer 30 of the bottom glass substrate 12, the protrusions 40, and the spacers 42 of the top glass substrate 36, respectively, consequently leading to a complicated process and a raised production cost. In addition, due to a misalignment phenomenon caused by performing the PEP many times, the BM layer 20 may not shield the underlying TFT structures 16 perfectly, generating light leakage, and affecting the normal operation of the TFT-LCD 10.

SUMMARY OF INVENTION

It is therefore a primary objective of the claimed invention to provide a self-aligned method for forming pixel electrodes of the LCD to simply the process and reduce the production cost.

It is another object of the claimed invention to provide a method for forming a TFT-LCD, with spacers formed between two substrates of the TFT-LCD also functioning as a black matrix layer of the TFT-LCD.

According to the preferred embodiment of the claimed invention, a method for forming a self-aligned pixel electrode of a TFT-LCD is disclosed. The TFT-LCD is formed on a substrate that comprises a plurality of scan lines and a plurality of signal lines perpendicular to the scan lines. The scan lines and the signal lines define a plurality of adjacent pixel electrode regions on the substrate. First, a photosensitive material layer is formed on the substrate and portions of the photosensitive material layer inside the pixel electrode regions are removed to leave a residual photosensitive material layer on the scan lines and the signal lines. The residual photosensitive material layer is used as a spacer and a top surface area of the spacer is larger than a bottom surface area of the spacer. Then, a transparent conductive layer is formed on the substrate to cover the spacer and the pixel electrode regions. The transparent conductive layer that covers the pixel electrode regions is separated from the spacer so as to form the self-aligned pixel electrode.

In the claimed invention, the residual photosensitive material layer having an undercut profile formed on the scan lines and the signal lines functions as the spacer of the TFT-LCD. Therefore, the transparent conductive layer formed in a subsequent process is separated from the spacer. Therefore, the present invention has the advantages of simplifying the process, reducing cost, and solving the misalignment problem caused by performing the PEP many times.

These and other objectives of the claimed invention will no doubt become obvious to those of ordinary skill in the art after reading the following detailed description of the preferred embodiment that is illustrated in the various figures and drawings.

DETAILED DESCRIPTION

In a preferred embodiment of the present invention, a COA type low temperature polysilicon (LTPS) TFT-LCD having a top gate structure is disclosed. Nevertheless, the present invention is not limited to this, various kinds of LCDs can utilize the method of the present invention to form self-aligned pixel electrodes.

Figure 1:
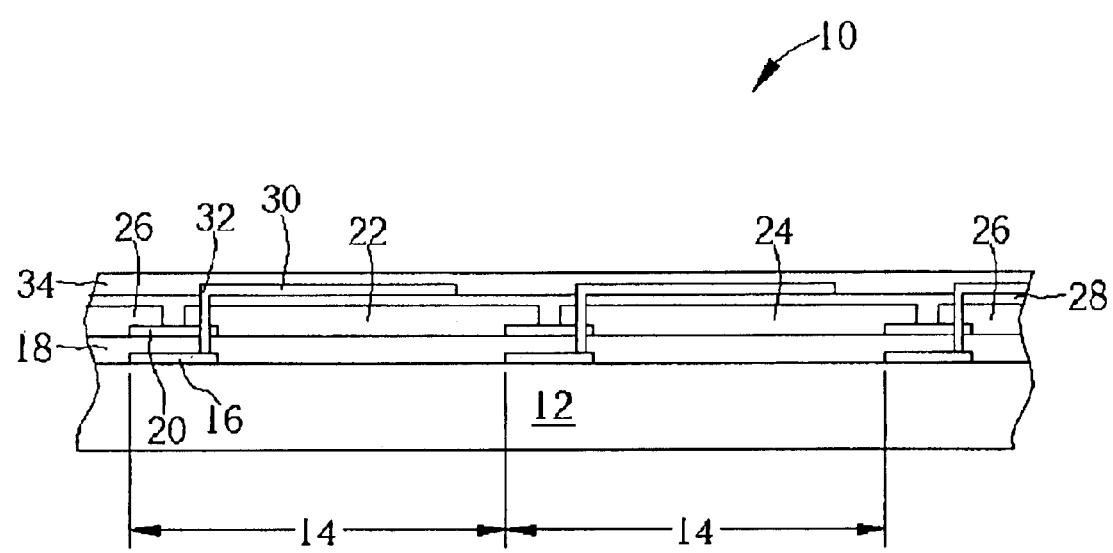
FIG. 1 to FIG. 3 are schematic diagrams of a method for forming a COA type TFT-LCD according to the prior art.
Figure 2:
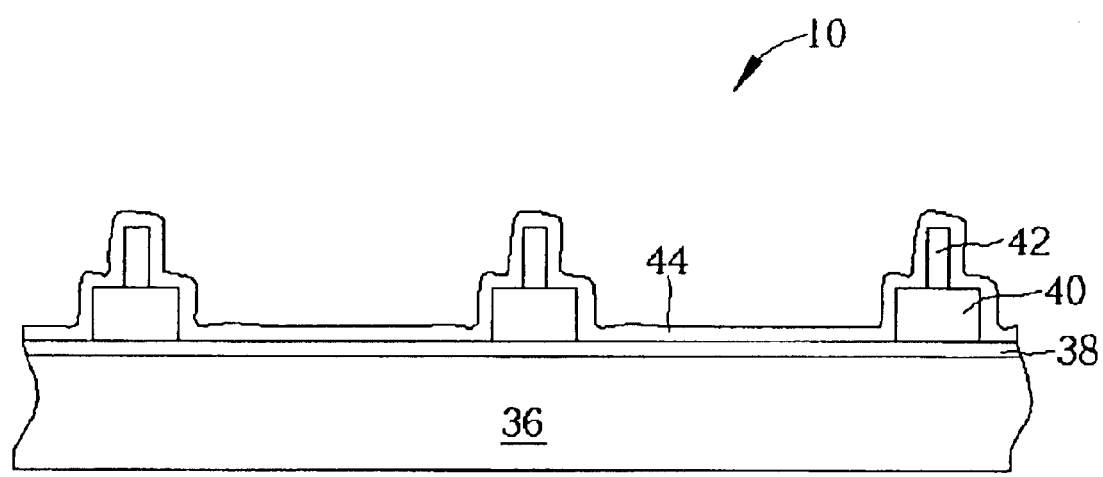
Figure 3:
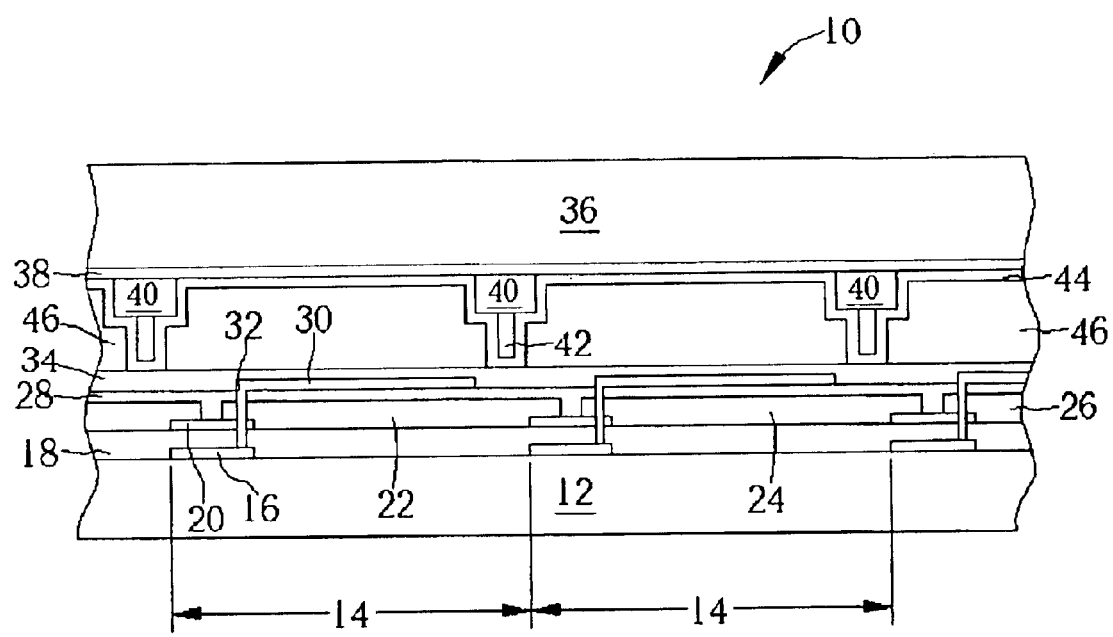
Figure 4:
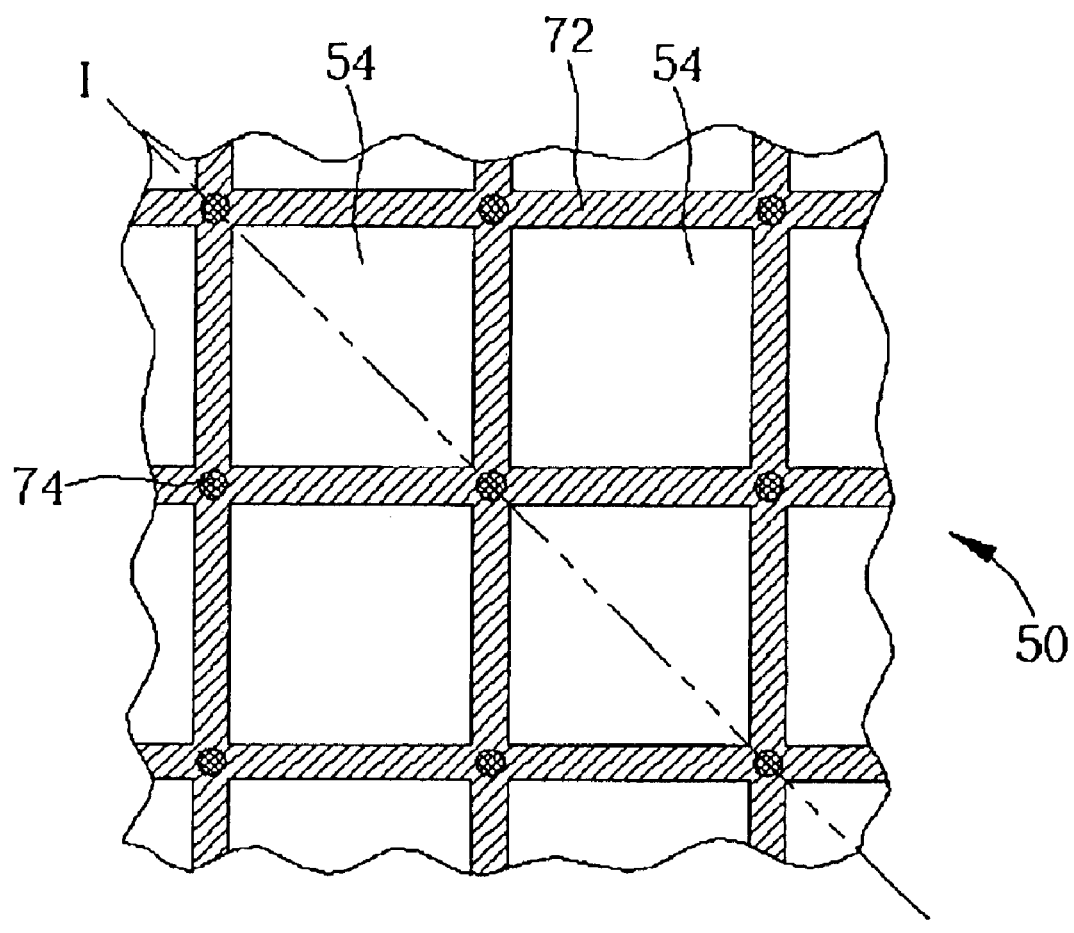
FIG. 4 is a part top view of a COA type TFT-LCD according to the present invention.
Figure 5:
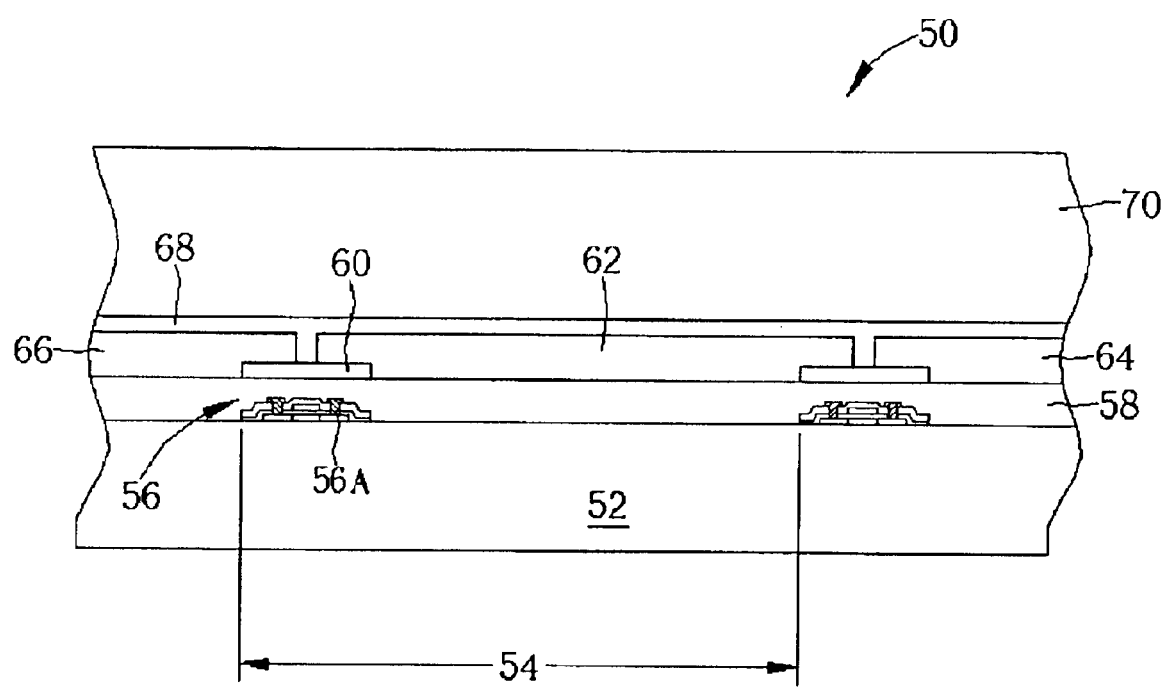
FIG. 5 to FIG. 7 are schematic diagrams along a line 1—1 shown in FIG. 4 of a method for forming the TFT-LCD.
Figure 6:
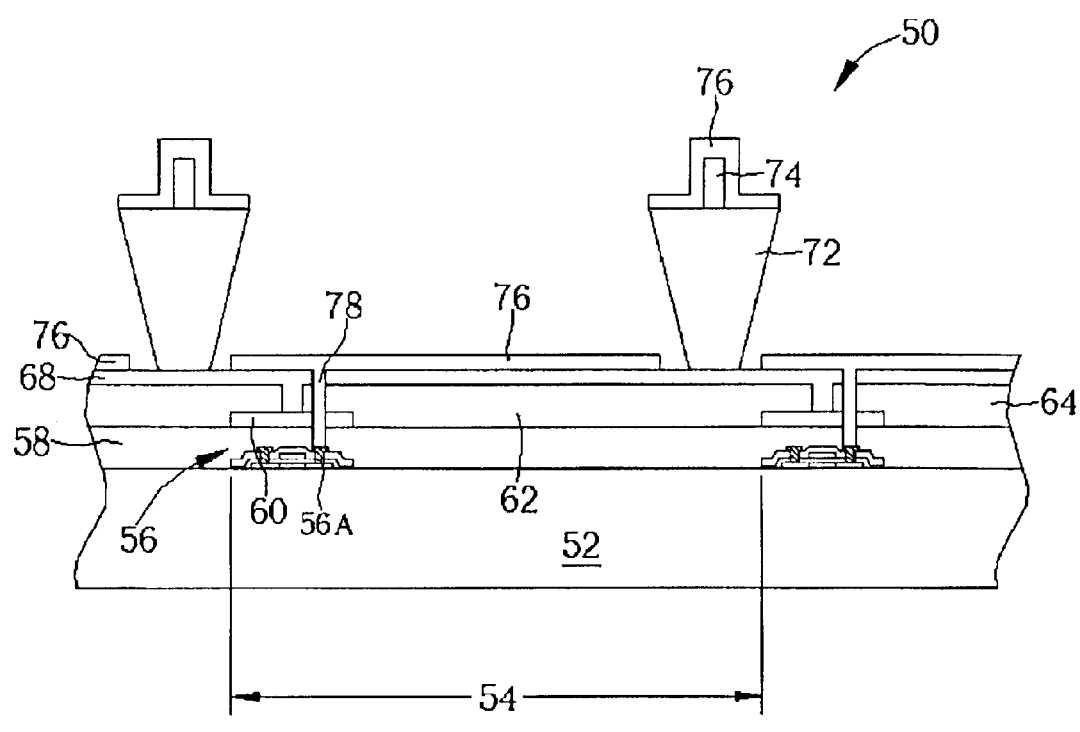
Figure 7:
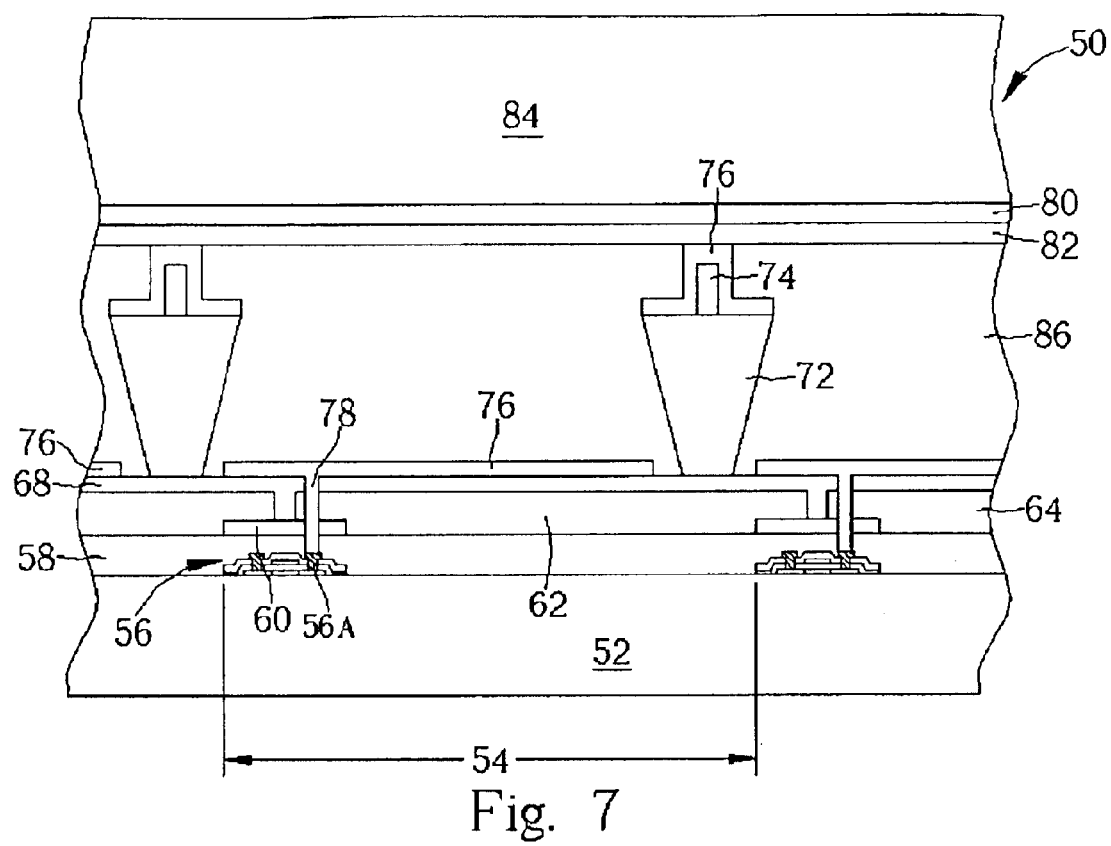
Figure 8:
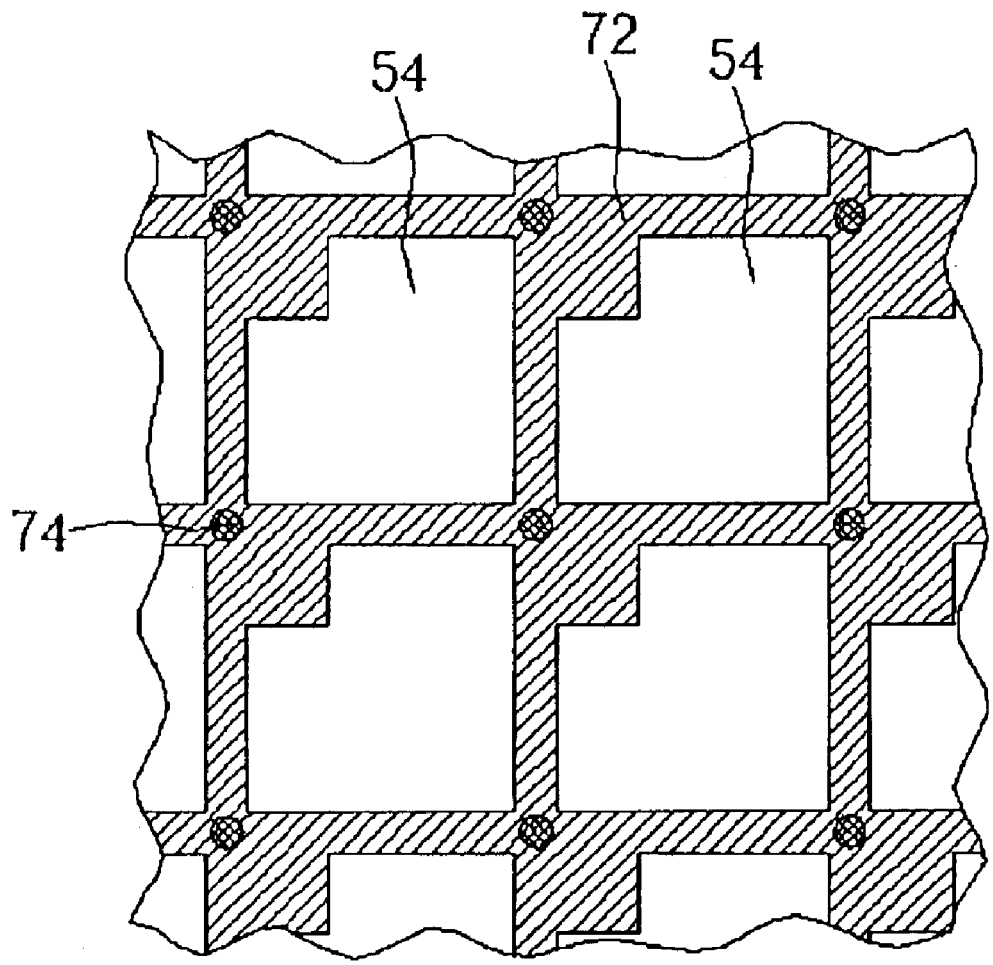
FIG. 8 is a part top view of another COA type TFT-LCD according the present invention.

Please refer to FIG. 4 to FIG. 8. FIG. 4 is a part top view of a TFT-LCD 50 according to a preferred embodiment of the present invention. FIG. 5 to FIG. 7 are schematic diagrams along a line 1—1 shown in FIG. 4 of a method for forming the TFT-LCD 50. FIG. 8 is a part top view of a COA type TFT-LCD according to another embodiment of the present invention.

As shown in FIG. 4 and FIG. 5, the TFT-LCD 50 includes a bottom glass substrate 52, and a plurality of scan lines and a plurality of signal lines perpendicular to the scan lines (not shown in FIG. 4 and FIG. 5) are formed on a surface of the bottom glass substrate 52. The signal lines and the scan lines define a plurality of adjacent pixel electrode regions 54 on the bottom glass substrate 52. Each pixel electrode region 54 includes a TFT structure 56 comprised of a polysilicon layer, a top gate conductive layer, a gate dielectric layer, a channel layer, a source electrode (not shown in FIG. 4 and FIG. 5), and a drain electrode 56A.

Then, a planarizing layer 58 is formed on the bottom glass substrate 52 that covers the TFT structures 56. Next, a plurality of BM layers 60 corresponding to the underlying TFT structures 56 are formed on the planarizing layer 58. An R/G/B CFA that comprises the red CFA 62, the green CFA 64, and the blue CFA 66, is formed on the planarizing layer 58. Thereafter, an overcoat layer 68 and a photosensitive material layer 70 with a thickness of approximately 3 to 4 $\mu$m are formed on the R/G/B CFA 62, 64, 66, respectively.

As shown in FIG. 6, a photo mask (not shown in FIG. 6) is utilized to perform a PEP to remove portions of the photosensitive material layer 70 inside the pixel electrode regions 54 so as to leave a residual photosensitive material layer, functioning as spacers 72 of the TFT-LCD 10, on the scan lines and the signal lines as shown in FIG. 4.

Moreover, each spacer 72 has an undercut profile, such as a trapezoidal shape, caused by adjusting parameters of exposure energy and exposure time of the PEP, so that a top surface area of each spacer 72 is larger than a bottom surface area of each spacer 72. In addition, a plurality of protrusions 74 can be formed on the spacers 72, especially at intersections of the signal lines and the scan lines, as shown in FIG. 4, to facilitate convenient filling of a cell gap of the TFF-LCD 50 with liquid crystal.

Thereafter, a plurality of contact holes (not shown in FIG. 6) are formed in the overcoat layer 68, the R/G/B CFA 62, 44, 66, the BM layers 60, and the planarizing layer 58. Then a transparent conductive layer 76, such as indium tin oxide (ITO), is deposited on the overcoat layer 68 to form self-aligned pixel electrodes, and the transparent conductive layer 76 also fills the contact holes to form a plurality of contact plugs 78 to connect the transparent conductive layer 76 and the drain electrodes 56A of the TFT strictures 56. Furthermore, due to each spacer 72 having the undercut profile, the transparent conductive layer 76 that covers the pixel electrode regions 54 is separated from the spacers 72, leading to the discontinuous transparent conductive layer 76.

As shown in FIG. 7, a top glass substrate 84 comprising a transparent conductive layer 80 and an orientation film 82, and the bottom glass substrate 52 are positioned face to face. Then a liquid crystal layer 86 is formed between the top glass substrate 84 and the bottom glass substrate 52 to accomplish the fabricating method of the TFT-LCD 50.

In addition, the spacers 72 are composed of photosensitive materials and formed on the signal lines and the scan lines in the preferred embodiment of the present invention. But the present invention is not limited in this, the spacers 72 can also be composed of black resin materials so that the spacers 72 that exist on the TFT structures 56 also function as the BM layers 60 of the TFT-LCD 50 for shielding and preventing the TFT structures 56 from generating light leakage, as shown in FIG. 8.

To sum up, the present invention utilizes the residual photosensitive material layer having an undercut profile formed on the scan lines and the signal lines as the spacers of the TFT-LCD. Consequently, the cell gap of the TFT-LCD is maintained and controlled precisely. In addition, the transparent conductive layer formed on the bottom glass substrate utilizes the spacers to self-align the discontinuous transparent conductive layer, and a PEP is not required. Therefore, the present invention has advantages of simplifying the process, reducing cost, and preventing from the misalignment problem caused by performing the PEP too many times.

In comparison with the conventional method, the present invention does not have to utilize the PEP to pattern the transparent conductive layer of the bottom glass substrate. The transparent conductive layer is separated from the spacers. Furthermore, the spacers also function as the BM layers to shield the underlying TFT structures, raise the contrast of the TFT-LCD, and increase the display performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for forming a self-aligned pixel electrode of a liquid crystal display (LCD), the LCD being formed on a substrate that comprises a plurality of scan lines and a plurality of signal lines perpendicular to the scan lines, the scan lines and the signal lines defining a plurality of adjacent pixel electrode regions on the substrate, the method comprising the following steps:

forming a photosensitive material layer on the substrate;

removing portions of the photosensitive material layer inside the pixel electrode regions to leave a residual photosensitive material layer on the scan lines and the signal lines, wherein the residual photosensitive material layer is used as a spacer, and a top surface area of the spacer is larger than a bottom surface area of the spacer; and forming a transparent conductive layer on the substrate to cover the spacer and the pixel electrode regions;

wherein the transparent conductive layer that covers the pixel electrode regions is separated from the spacer so as to form the self-aligned pixel electrode.

2. The method of the claim 1 wherein the LCD is a low temperature polysilicon thin film transistor LCD (LTPS TFT-LCD).

3. The method of the claim 1 wherein the substrate further comprises a red/green/blue color filter array (R/G/B CFA) formed in each of the pixel electrode regions.

4. The method of the claim 3 wherein the LCD is a color filter on array (COA) type LCD.

5. The method of the claim 4 wherein a plurality of contact holes are formed in the R/G/B CFA before forming the transparent conductive layer.

6. The method of the claim 5 wherein the contact holes are filled with the transparent layer while forming the transparent conductive layer on the substrate.

7. The method of the claim 1 wherein the substrate is a transparent glass substrate.

8. The method of the claim 1 wherein a cross-sectional view of the spacer has a trapezoidal shape.

9. The method of the claim 1 wherein the spacer formed on the scan lines and the signal lines is used as a black matrix layer.

10. The method of the claim 1 wherein the spacer has a thickness of approximately 3 to 4 micrometers ($\mu$m).

11. The method of the claim 1 wherein the transparent conductive layer comprises indium tin oxide (ITO).

12. The method of the claim 1 wherein a protection layer is formed on the substrate before forming the photosensitive material layer on the substrate.

13. A method for forming a self-aligned pixel electrode of a liquid crystal display (LCD), the LCD being formed on a substrate that comprises a plurality of adjacent pixel electrode regions, each of the pixel electrode regions and its adjacent pixel electrodes having a joint side, the method comprising the following steps:

forming a black matrix layer on the substrate;

removing portions of the black matrix layer inside the pixel electrode regions to form a residual black matrix layer on the joint sides, the residual black matrix layer having an undercut profile; and forming a transparent conductive layer on the substrate, the transparent conductive layer covering the pixel electrode regions being separated from the residual black matrix layer so as to form the self-aligned pixel electrode.

14. The method of the claim 13 wherein a top surface area of the residual black matrix layer is larger than a bottom surface area of the residual black matrix layer.

15. The method of the claim 13 wherein a cross-sectional view of the residual black matrix layer has a trapezoidal shape.

16. The method of the claim 13 wherein the LCD further comprises a plurality of scan lines and a plurality of signal lines formed on the substrate, and the residual black matrix layer is formed on the scan lines and the signal lines.

17. The method of the claim 13 wherein the residual black matrix layer formed on the scan lines and the signal lines is used as a spacer of the LCD.

18. The method of the claim 17 wherein the spacer has a thickness of approximately 3 to 4 micrometers ($\mu$m).

19. The method of the claim 13 wherein the transparent conductive layer comprises indium tin oxide (ITO).

20. The method of the claim 13 wherein a protection layer is formed on the substrate before forming the black matrix layer on the substrate.

* * * * *